W. G. B. EULER, J. A. KOONTZ, Jr., AND C. F. BENHAM.
INSULATOR TESTING DEVICE.
APPLICATION FILED MAR. 15, 1920.
1,370,638.
Patented Mar. 8, 1921.
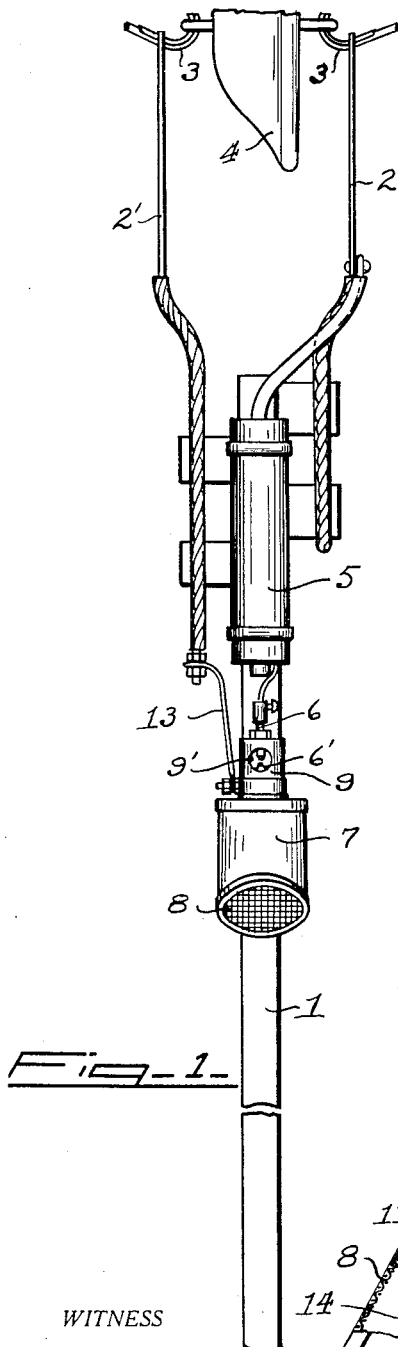
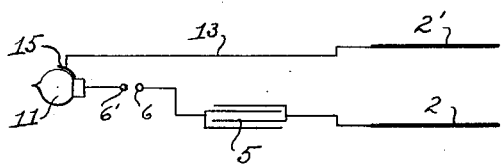
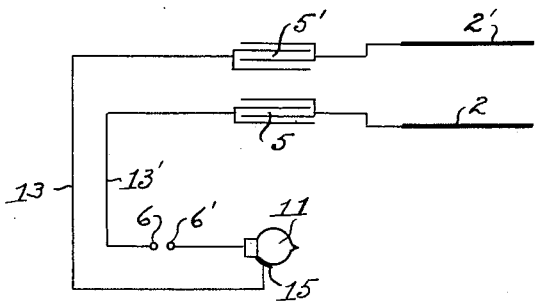
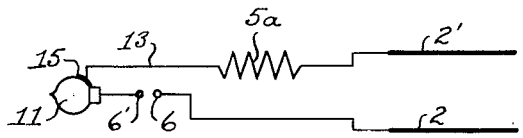
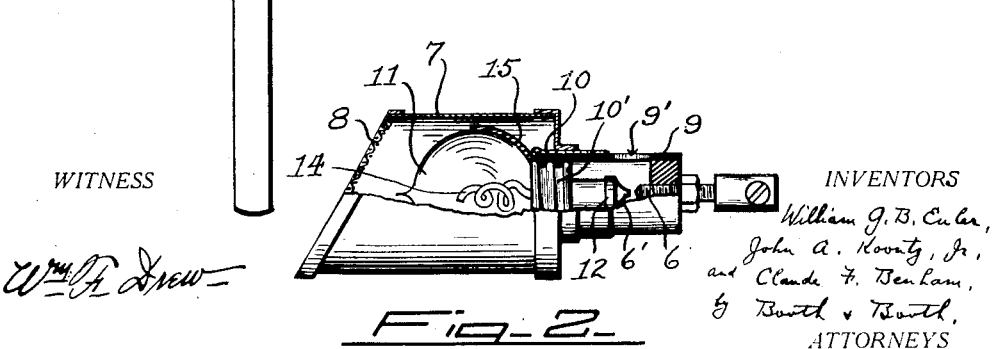

UNITED STATES PATENT OFFICE.

WILLIAM G. B. EULER, OF SAN FRANCISCO, JOHN A. KOONTZ, JR., OF PALO ALTO, AND CLAUDE F. BENHAM, OF ALAMEDA, CALIFORNIA.

INSULATOR-TESTING DEVICE.

1,370,638.  Specification of Letters Patent.  Patented Mar. 8, 1921.

Application filed March 15, 1920. Serial No. 365,792.

*To all whom it may concern:*

Be it known that we, WILLIAM G. B. EULER, JOHN A. KOONTZ, Jr., and CLAUDE F. BENHAM, citizens of the United States, residing the said EULER at the city and county of San Francisco and State of California, the said KOONTZ, Jr., at Palo Alto, Santa Clara county, State of California, and the said BENHAM at Alameda, county of Alameda, State of California, have invented certain new and useful Improvements in Insulator-Testing Devices, of which the following is a specification.

Our invention relates to devices for testing electric insulators by measuring the difference of potential between the conductor and the insulator-support, or between any two intermediate points in a multi-part insulator.

The object of our invention is to provide a device of the class described which may be used for testing insulators carrying high-potential conductors, such, for example, as the supporting insulators of high-tension alternating current electric transmission lines, without taking the line or conductor out of service, and without danger either to the operator or to the line or circuit in which the insulator is included.

The testing of insulators has heretofore necessitated cutting out the particular conductor or line involved, with consequent interruption of service and more or less dislocation of the entire system. By the use of our invention, however, the insulators of any given line may be tested while the line is in use, and then a convenient time may be selected for making all necessary repairs. The result, obviously, is a considerable saving in time and labor, and the reduction to a minimum of interruptions to service. Moreover, in the use of a device embodying the principles of our invention, there is neither personal danger to the lineman nor danger of accident to the line or system by short-circuiting or grounding.

Broadly, our invention comprises a shunt circuit connected around the insulator, said circuit having sufficient effective impedance to prevent dangerous flow of current. This shunt circuit includes, in addition to the current-limiting devices, an indicator consisting of a vacuum or gas-filled tube having separated electrodes, which glows when a current is passed through it. Thus the amount of current passing through the shunt circuit, which is directly proportional to the electrical condition or resistance of the insulator, is indicated by the brilliancy of the glower. In the case of a totally defective insulator, there would be no difference in potential between the ends of the shunt circuit, no current would flow, and consequently there would be no glow in the tube.

With this in view, our invention will now be described in detail with reference to the accompanying drawings, wherein—

Figure 1 is a complete view of a preferred form of device embodying our invention.

Fig. 2 is a part-sectional view, enlarged, of the glow-tube and its mounting.

Fig. 3 is a diagram showing the electrical connections of the device illustrated in Fig. 1.

Fig. 4 is a diagram showing the electrical connections of a modified form of our invention.

Fig. 5 is a diagram showing the electrical connections of a second modification of our invention.

In the drawings, and referring more particularly to Fig. 1 thereof, the reference numeral 1 designates a handle formed of some insulating material, preferably wood. A pair of spaced contacts 2 and 2' are secured to the handle 1, and are insulated from it and from each other. These contacts are so spaced as to be adapted for electrical connection with two metal elements 3 on either side of an insulator 4. In the particular case illustrated, I have shown at 4 a portion of a strain-insulator, but it is obvious that the contacts 2 and 2' may be so adjusted, by bending or otherwise, as to be adapted to make connection with any two conducting elements between which an insulator or an insulator unit or portion is interposed.

A condenser 5 is mounted on the handle 1, and has one of its terminals connected with the contact 2, and its other terminal connected with one terminal 6 of an adjustable air-gap. A cylindrical shield or housing 7 is also mounted on the handle 1, having an open end protected by a removable screen 8. The other end of said housing supports a tubular member 9, Figs. 1 and 2, formed preferably of insulating material, whose outer end carries the adjustable air-gap terminal 6. Within the other end of said member 9 is a receptacle 10, Fig. 2, adapted to receive the base 10' of a glower-tube 11, the central contact 12 of said glower tube forming another terminal 6' for the air-gap, which may be observed, for adjustment, through an aperture 9' formed in the wall of the tubular housing 9. The glower base socket 10 is connected by a wire 13, Fig. 1, with the second contact 2'.

The glower-tube 11 which we have illustrated in this preferred form of our invention is a standard article of manufacture, comprising an exhausted or gas-filled glass bulb having a central electrode, not shown, sealed in the base of a spirally disposed glass tube 14, and connected with the central terminal 12, and an exterior electrode 15 connected with the threaded base of the tube. It is to be understood, however, that any suitable form of vacuum or gas-filled glower-tube may be used.

Referring now to Fig. 3 of the drawings, it will be seen that when a sufficiently high voltage is impressed on the contacts 2 and 2', a current will flow through the circuit. The condenser 5 and the air-gap 6 and 6' act not only to limit the amount of current flow, but also to select the proper higher harmonics of the fundamental frequency of the current in order to amplify the glow in the tube 11. In using this form of the device, the operator climbs the pole on which is carried the insulator to be tested, and, holding the device by the insulated handle 1, Fig. 1, touches the contacts 2 and 2' to the metal parts 3 of the insulator 4, and observes the intensity of the glow in the tube 11. On account of the very high effective impedance in the circuit, produced by the condenser 5, the air-gap 6 and 6', and the glower 11 itself, the amount of current flowing through the circuit will be so small as to present no danger, either to the operator or the conductor supported by the tested insulator.

In certain cases it may be desirable to separate the indicator or glower from the contacts 2 and 2', the contacts being carried up the pole by one operator, and the glower remaining on the ground to be observed by another. In this case we prefer to arrange the shunt circuit as shown in Fig. 4, having two condensers 5 and 5', adjacent to the contacts 2 and 2', one terminal of each condenser being connected with one of the contacts 2 and 2', and the other terminals connected by flexible wires 13 and 13' with the glower 11 and air-gap 6 and 6', respectively, which may be located at any distance from the contacts 2 and 2'. The extra condenser 5' in this case is necessary to prevent dangerous flow of current in the event of grounding or short-circuiting the wire 13 or the glower terminal 15.

Another modification of our shunt circuit is illustrated in Fig. 5, in which the condenser 5 of Fig. 3 is replaced by resistance 5ª, which may be either inductive or non-inductive. Various combinations of the means shown in Figs. 3, 4 and 5 may also be used, but as such combinations would naturally present themselves to anyone skilled in the art, we have deemed it unnecessary to illustrate them specifically, the general effect being the same in all cases, which is the inclusion in the shunt circuit of sufficient effective impedance to limit the current to a safe amount and of proper means for selecting the proper harmonics of the fundamental frequency of the current in order to produce the maximum luminosity in the glower, and for adjusting the effective voltage at the glower terminals to the necessary degree. It may even be desirable in some cases to do away with all current-limiting devices except the glower itself, using a glower of sufficiently high resistance to produce the necessary impedance.

It is to be understood, therefore, that our invention is not to be limited to the forms described and illustrated herewith, except as set forth in the claims hereto appended, and that changes may be made in the form and construction of the device, within the scope of the claims, without departing from the spirit of the invention.

We claim:—

1. A device for testing insulators comprising a shunt circuit adapted to be connected around the insulator to be tested; current-limiting devices included in said circuit; means included in said circuit for selecting the frequency of the current flowing therethrough; and an indicator responsive to high-frequency currents included in said circuit.

2. A device for testing insulators comprising a shunt circuit adapted to be connected around the insulator to be tested; a condenser included in said circuit; and a luminous indicator also included in said circuit, said indicator being adapted to glow when a current is passed through the circuit.

3. A device for testing insulators comprising a shunt circuit adapted to be connected around the insulator to be tested; a condenser and an air-gap included in said circuit; and a luminous indicator also included in said circuit, said indicator being adapted to glow when a current is passed through the circuit.

4. A device for testing insulators comprising an insulated handle; a pair of contacts extending therefrom and adapted to be connected on each side of the insulator to be tested; a luminous indicator mounted on said handle, said indicator having its terminals respectively connected with said contacts and being adapted to glow when a current is passed therethrough; and a condenser mounted on said handle and included in the circuit formed by said indicator and said contacts.

5. A device for testing insulators, comprising an insulated handle; a pair of contacts extending therefrom and adapted to be connected on each side of the insulator to be tested; a condenser mounted on said handle, one terminal thereof being connected with one of said contacts; and a glower tube mounted on said handle and having separated electrodes, one connected with the second of said contacts and the other connected, through an air-gap, with the other terminal of said condenser.

In testimony whereof we have signed our names to this specification.

WILLIAM G. B. EULER.
JOHN A. KOONTZ, Jr.
CLAUDE F. BENHAM.